United States Patent
Chen et al.

(10) Patent No.: US 11,952,436 B2
(45) Date of Patent: *Apr. 9, 2024

(54) ULTRASOUND AND PRESSURE ASSISTED METHOD FOR EXTRACTING PECTIN RICH IN RG-I

(71) Applicant: ZHEJIANG UNIVERSITY, Hangzhou (CN)

(72) Inventors: Shiguo Chen, Hangzhou (CN); Weiwei Hu, Hangzhou (CN); Xingqian Ye, Hangzhou (CN); Huan Cheng, Hangzhou (CN); Donghong Liu, Hangzhou (CN); Chantapakul Thunthacha, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 605 days.

This patent is subject to a terminal disclaimer.

(21) Appl. No.: 17/267,487

(22) PCT Filed: Dec. 3, 2019

(86) PCT No.: PCT/CN2019/122624
§ 371 (c)(1),
(2) Date: Feb. 9, 2021

(87) PCT Pub. No.: WO2021/108977
PCT Pub. Date: Jun. 10, 2021

(65) Prior Publication Data
US 2022/0112314 A1 Apr. 14, 2022

(51) Int. Cl.
*C08B 37/00* (2006.01)

(52) U.S. Cl.
CPC .............................. *C08B 37/0048* (2013.01)

(58) Field of Classification Search
None
See application file for complete search history.

(56) References Cited

FOREIGN PATENT DOCUMENTS

CN 109096353 A * 12/2018

* cited by examiner

*Primary Examiner* — Dale R Miller

(57) ABSTRACT

The present disclosure discloses a method for extracting pectin rich in RG-I, in particular to an ultrasound and pressure assisted method for extracting pectin rich in RG-I. The main process includes: dispersing sieved citrus peel powers in alkaline solution containing sodium borohydride (20 to 50 mM); performing an ultrasound and pressure combined treatment on the above solution at 25 to 40° C., the treatment conditions include: static pressure of 0.2 to 0.4 MPa, ultrasonic intensity of 0.5 to 3.5 W/mL, and treatment time of 20 to 40 min; centrifuging the ultrasonically processed solution to remove residues, and sequentially carrying out precipitation with ethanol (50% to 80% v/v), precipitant dialysis (3000 to 3500 Da), and vacuum freeze drying on the extracted solution to obtain pectic polysaccharide.

6 Claims, 3 Drawing Sheets

ULTRASOUND AND PRESSURE ASSISTED METHOD FOR EXTRACTING PECTIN RICH IN RG-I

FIELD

The present disclosure relates to an ultrasound and pressure assisted method for extracting a pectin rich in RG-I, in particular to an ultrasound and pressure assisted method for extracting a pectic polysaccharide rich in RG-I, which belongs to the technical field of functional sugar.

BACKGROUND

Pectin, a kind of complex macromolecular acidic heteropolysaccharide, is mainly composed of D-galacturonic acid linked by α-1,4 glycosidic bonds, and widely exists in cell walls of terrestrial plants, and is an important component of plant cytoplasm. The main structures of the pectin include polygalacturonan (HG), rhamnogalacturonan I(RG-I), and a small amount of rhamnogalacturonan II(RG-II). Pectin has a variety of functional properties. As a gelling agent, thickener, stabilizer, and synergist, the pectin has been widely used in the food industry, such as yogurt, jam, jelly, fruit juice and other products. Pectin can also be used in fields such as fat replacement and drug delivery, etc. Therefore, in order to obtain pectin with uniform quality and good gelling properties, producers usually use strong acid and high temperature to treat raw materials, which may degrade the side chains of the pectin. The commercial pectin obtained is usually mainly composed of HG structure, with less RG-I structure.

Recent studies have shown that the RG-I pectin has biological activities such as beneficial to gut health and regulating chronic metabolic syndrome, and its RG-I domains can block the recognition of galectin-3 (Gal-3) with other proteins and peptides by combining with Gal-3, and can inhibit processes of cell adhesion and apoptosis, thus preventing cancer and cardiovascular diseases better. And RG-I pectin can form sugar-free gel by pH induction, microwave induction and so on. In view of its potential biological activity and unique application prospect, the RG-I pectin should be retained, extracted, developed and utilized.

At present, the method for extracting RG-I pectin mainly includes extracting polysaccharides from plant cell walls layer by layer. In order to improve the extracting efficiency of pectin and reduce the use of chemicals, it is very important to study new technical methods to extract RG-I pectin efficiently.

SUMMARY

The purpose of the present disclosure is to address deficiencies of the existing art, and provide a method for extracting pectin rich in RG-I. The method, supplemented by a combined action of ultrasound and pressure, takes an alkaline system as an extracting solvent at room temperature, to prevent hydrolysis of pectin side chains during the extracting process. So that the extracting rate of pectin is greatly improved, and the pectin rich in RG-I domain is obtained after alcohol precipitation, dialysis and drying.

The purpose of the present disclosure is realized by the following technical solutions:

(1) drying and crushing citrus peel to acquire citrus peel powers, sieving the citrus peel powers with 50 mesh sieve, then dispersing the citrus peel powers in alkaline solution containing sodium borohydride to obtain a mixed solution; transferring the mixed solution into a closed container, keeping a reaction temperature at 25 to 40° C., and introducing an inert gas into the closed container to control an internal static pressure at 0.2 to 0.4 mpa; carrying out an ultrasonic treatment on the mixed solution simultaneously, wherein an ultrasonic intensity is controlled at 0.5 to 3.5 W/ml, an ultrasound and pressure assisted treatment time is controlled within 20 to 40 min;

(2) centrifuging a system subjected to step (1) at a speed of 6000 to 8000 rpm to remove residues, retaining a supernatant, and adding absolute ethanol to the supernatant to precipitate pectic polysaccharide; and (3) adding water to the pectic polysaccharide precipitant subjected to step (3) to obtain a redissolved solution, transferring the solution to a dialysis bag with a molecular weight cut-off of 3000 to 3500 Da, dialyzing with running water for 48 hours, and drying in a vacuum freezer to obtain the pectin rich in RG-I.

Furthermore, the citrus peel powder is mixed with the alkaline solution according to a solid-liquid ratio of 1:50 g/mL, and an alkali in the alkaline solution is sodium hydroxide or potassium hydroxide with a concentration of 0.05 to 0.1 mol/L, and a concentration of sodium borohydride is 20 to 50 mmol/L.

Furthermore, the closed container is placed in a water bath environment.

Furthermore, the ultrasonic treatment is to insert an ultrasonic probe into the closed container and deep into the mixed solution.

Furthermore, a centrifuging time is 20 to 30 min, and an ethanol precipitation concentration is 50% to 80% v/v.

Furthermore, the precipitated pectic polysaccharide obtained by ethanol precipitation is washed with absolute ethanol for 2 to 3 times, and water for redissolving and dialysis is deionized water.

The beneficial effects of the present disclosure are: the ultrasound and pressure assisted method for extracting pectin rich in RG-I of the present disclosure has mild extracting conditions, retains neutral sugar side chains to obtain the pectic polysaccharides with a high proportion of RG-I domains. Compared with the prior art, this method has simple extracting process, short extracting time and high extracting rate; and the obtained pectin has rich biologically active structural domains.

DETAILED DESCRIPTION OF THE EMBODIMENTS

Figure 1:
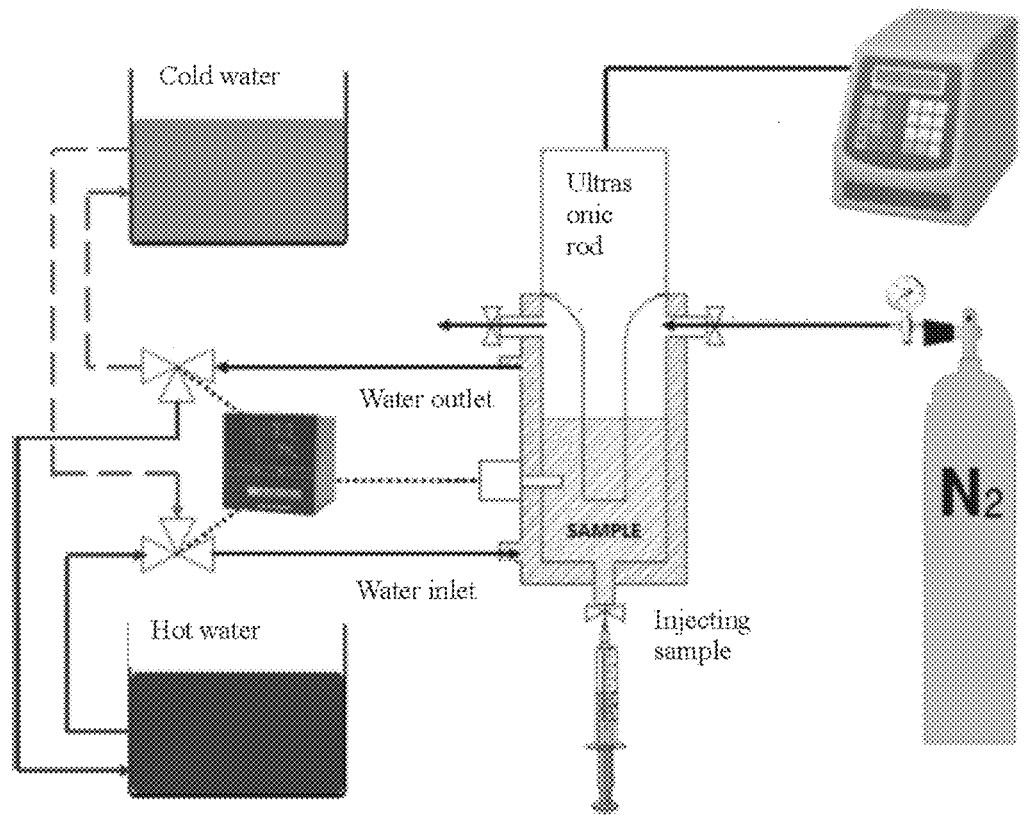
FIG. 1 is a schematic diagram of an ultrasound and pressure combined processing device.

The apparatus for ultrasound and pressure combined treatment in the present disclosure is shown in FIG. 1. A main component of the apparatus is a closed container, a sample is injected into the closed container through a syringe from a bottom of the closed container, a liquid nitrogen tank is configured to inject nitrogen into the closed container, and an internal static pressure is controlled through a control valve. An ultrasonic probe is inserted into a mixed solution to perform an ultrasonic treatment on the sample. An outer container is filled with water and provides a water bath environment to heat the sample in the closed container. The present disclosure will be further described in detail below in conjunction with embodiments, but the implementations of the present disclosure are not limited thereto.

Embodiment 1

After drying and grinding citrus peel, the citrus peel powers was sieved with 50 mesh sieve, 0.7 g citrus peel powders were fully mixed with 50 mmol/L sodium hydroxide solution containing 20 mmol/L sodium borohydride according to a solid-liquid ratio of 1:50 g/mL, then the obtained system was placed in a constant temperature water bath of 25° C. for an ultrasound and pressure combined treatment. The ultrasonic treatment conditions are: ultrasonic intensity 0.5 W/mL, static pressure 0.2 MPa, ultrasonic temperature 25° C., ultrasonic volume 35 mL and ultrasonic time 40 minutes. The ultrasonic treated system was centrifuged at a speed of 6000 rpm for 20 min at room temperature, and 30 mL of supernatant was obtained after removing residues. The supernatant was added to absolute ethanol with an ethanol concentration of 50% v/v (a volume ratio of ethanol to supernatant), to precipitate the pectic polysaccharide. Further, the pectic polysaccharide precipitant obtained by ethanol precipitation was washed with absolute ethanol for 3 times, then the pectic polysaccharide precipitant was redissolved with deionized water, the redissolved pectic polysaccharide solution was transferred to a dialysis bag with a molecular weight cut-off of 3500 Da, dialyzed in pure water for 48 h, then dried in a vacuum freezer to obtain 0.12 g of dry pectic polysaccharide powder. The yield was 20% calculated according to the following formula:

$$Y = \frac{m_1}{M} \times \frac{V}{V_f} \times 100\%$$

Y (%) is the yield of pectic polysaccharide, ml(g) is a mass of pectic polysaccharide, M (g) is a mass of citrus peel powders, V (mL) is a volume of ultrasonic treated system, and Vf (mL) is a volume of supernatant after centrifugation.

The properties and structure of pectic polysaccharide were determined:

Molecular Weight

Pectic polysaccharide was dissolved in deionized water to obtain a solution with a concentration of 3 mg/mL, and the solution was injected into SEC-MALLS-RI (Wyatt Dawn Heleos-Il, USA) system for detection after passing through a 0.22 μm water film. An injection volume was 50 μL, an analytical column was Shodex SB-804/806 (Showa Denko KK, Japan), a mobile phase was 0.15M sodium chloride solution, a flow rate was 0.5 mL/min, dn/dc=0.088 mL/g. A weight-average molecular weight of the pectic polysaccharide was measured to be 776 KDa, a number-average molecular weight of the pectic polysaccharide was measured to be 342 KDa, and the dispersibility of the pectic polysaccharide was measured to be 2.26.

Composition of Monosaccharide

Pectic polysaccharide was dissolved in deionized water to prepare a solution with a concentration of 2 mg/mL, 1 mL of 4M tetrafluoroacetic acid was added to the solution to acquire a mixture, the mixture was hydrolyzed at 110° C. for 8 hours, then cooled to the room temperature, and 1 mL of methanol was added into the mixture, then the mixture was dried by nitrogen. 10 mL of deionized water was added into the dried product to acquire a mixture, the mixture was injected into the ICS-5000 (Thermo Fisher, USA) system for detection after passing through the 0.22 μm water membrane. The injection volume was 25 μL, the analytical column was CarboPac PA10 Analytical (Thermo Fisher, USA), the mobile phase A was 18 mM sodium hydroxide solution, and the mobile phase B was 100 mM sodium acetate solution containing 15 mM, the flow rate was 1 mL/min. In a gradient mode, the time gradient was 0 min→15 min→35 min, and the corresponding concentration gradient was 0→100% mobile phase A→100% mobile phase B.

TABLE 1

Composition of Monosaccharide of the pectic polysaccharide

| Type | Rhamnose (Rha) | Arabinose (Ara) | galactose (Gal) | Glucose (Glu) | mannose (Man) | Xylose (Xyl) | GalA (galacturonic acid) |
|---|---|---|---|---|---|---|---|
| Content (mol %) | 4 | 34.65 | 10.55 | 5.96 | 1.8 | 3.28 | 39.77 |

As shown in Table 1, the acidic sugar in pectic polysaccharide is mainly galacturonic acid with a content of 39.77%. A content of neutral sugar in pectic polysaccharide is relatively high, and among which arabinose is the neutral sugar with the highest content. HG % and RG-I % in pectic polysaccharide were calculated according to the following formula. The results show that the HG % mole percentage of the pectic polysaccharide is 35.77%, and the RG-I % mole percentage of the pectic polysaccharide is 53.2%, which indicating that the pectic polysaccharide is mainly composed of RG-I domain. A ratio of a sum of contents of arabinose and galactose to a content of the rhamnose is 11.3, indicating that the pectic polysaccharide has a higher degree of branching.

HG %=GalA %–Rha %

RG-I %=GalA %–HG %+Rha %+Gal %+Ara %

Infrared Spectrum

The infrared spectrum of the pectic polysaccharide was analyzed by Nicolet iN10 (Thermofisher, USA). The analysis steps include: mixing 1 mg pectic polysaccharide sample with 200 mg potassium bromide powders, grinding and tabletting the mixture, then performing an infrared spectrum scanning on the mixture with a scanning frequency ranging from 400 $cm^{-1}$ to 4000 $cm^{-1}$.

Figure 2:
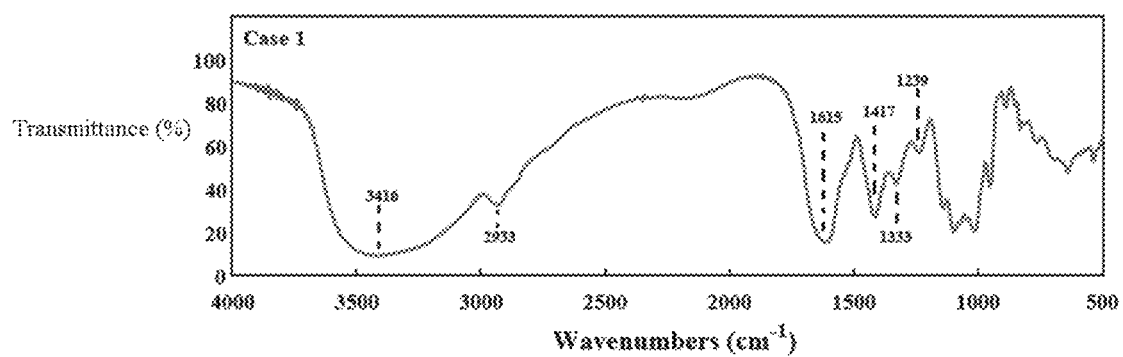
FIG. 2 is a near-red spectrum of embodiment 1.

FIG. 2 shows the near red spectrum of pectic polysaccharide. As shown in FIG. 2, the absorption peak near 3416 $cm^{-1}$ is mainly caused by O— stretching vibration, while the absorption peak at 2933 cm$^{-1}$ is caused by C—H stretching vibration of CH$_2$ group. The absorption peak at 1615 cm$^{-1}$ is attributed to the C=O stretching vibration of free carboxyl group. Generally, a ratio of a peak area at 1745 cm$^{-1}$ (COO—R) to a sum of peak areas at 1743 cm$^{-1}$ (OO—R) and 1615 cm$^{-1}$ (COO—) is defined as a degree of esterification. It can be seen from FIG. 2 that the degree of esterification of pectic polysaccharide is low.

Atomic Force Microscope Analysis

MultiMode (veeco instruments Inc, USA) was adopted to perform the atomic force microscope analysis of the pectic polysaccharide. The analysis steps include: dissolving 1 mg pectic polysaccharide sample in ultra-pure water to obtain a polysaccharide solution; stirring the polysaccharide solution magnetically; after the sample is completely dissolved, diluting the polysaccharide solution until a concentration of the sample is 1.0 μg/mL; filtering the polysaccharide solution by a 0.22 μm filter membrane; dropping 5 μL polysaccharide solution on a surface of a newly peeled mica; and performing an atomic force microscope test on the polysaccharide solution after the polysaccharide solution is dried in air. The test was carried out at room temperature and atmospheric environment with a humidity of 50% to 60%. The image was obtained in Tapping mode, and the probe was Si$_3$N$_4$.

Figure 3:
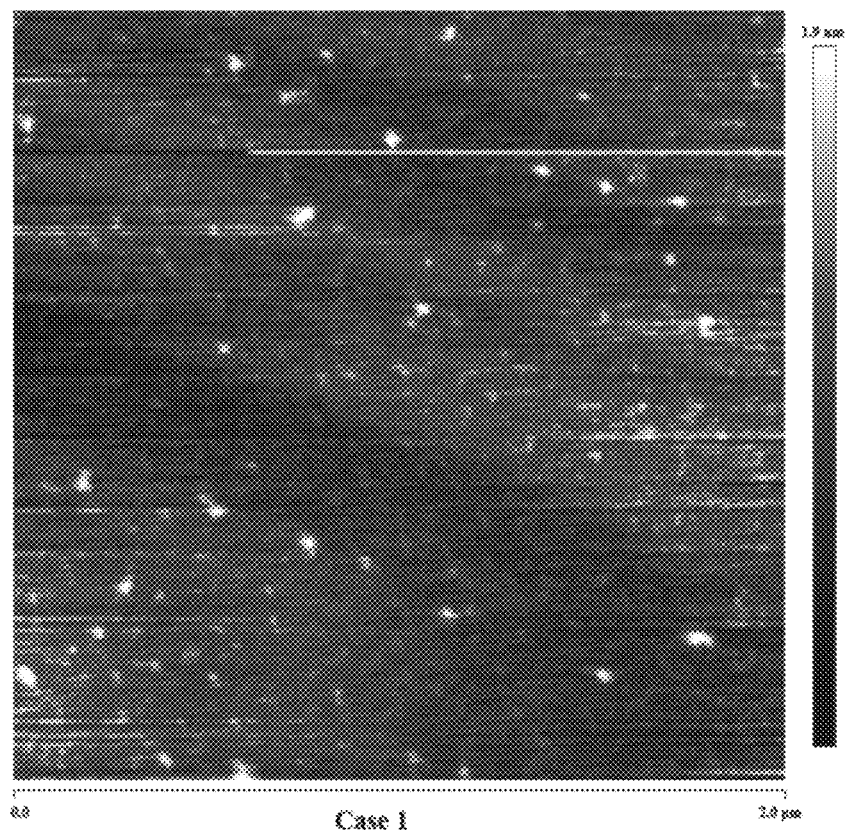
FIG. 3 is an atomic force microscope diagram of embodiment 1.

FIG. 3 shows an atomic force microscope image of the pectic polysaccharide. As shown in the FIG. 3, a chain morphology of the pectic polysaccharide is irregular spherical with a height of 1 to 4 nm. A chain height of the pectic polysaccharide is higher than that of single sugar (0.1 to 1 nm), which indicates there exists interactions among molecular chains and even a phenomenon of multiple molecular chains entangled.

Embodiment 2

After drying and grinding citrus peel, the citrus peel powers was sieved with 50 mesh sieve, 0.7 g citrus peel powders were fully mixed with 0.1 mol/L potassium hydroxide solution containing 50 mmol/L sodium borohydride according to a solid-liquid ratio of 1:50 g/mL, then the obtained system was placed in a constant temperature water bath of 40° C. for an ultrasound and pressure combined treatment. The ultrasonic treatment conditions are: ultrasonic intensity 3.5 W/mL, static pressure 0.4 MPa, ultrasonic temperature 40° C., ultrasonic volume 35 mL and ultrasonic time 20 minutes. The ultrasonic treated system was centrifuged at a speed of 8000 rpm for 20 min at room temperature, and 28 mL of supernatant was obtained after removing residues. The supernatant was added to absolute ethanol with an ethanol concentration of 80% v/v (a volume ratio of ethanol to supernatant), to precipitate the pectic polysaccharide. Further, the pectic polysaccharide precipitant obtained by ethanol precipitation was washed with absolute ethanol for 2 times, then the pectic polysaccharide precipitant was redissolved with deionized water, the redissolved pectic polysaccharide solution was transferred to a dialysis bag with a molecular weight cut-off of 3000 Da, dialyzed in pure water for 48 h, then dried in a vacuum freezer to obtain 0.15 g of dry pectic polysaccharide powder. The calculated yield was 26.8%.

The properties and structure of the pectic polysaccharide were determined. A weight-average molecular weight of the pectic polysaccharide was 601 KDa, a number-average molecular weight was 313 KDa, and a dispersibility was 1.92.

TABLE 2

| | Composition of Monosaccharide of the pectic polysaccharide | | | | | |
|---|---|---|---|---|---|---|
| Type | Rhamnose (Rha) | arabinose (Ara) | galactose (Gal) | Glucose (Glu) | Xylose (Xyl) | GalA (galacturonic acid) |
| Content (mol %) | 6.38 | 42.78 | 14.65 | 2.65 | 4.85 | 28.69 |

The results of composition of monosaccharide are shown in Table 2. The acidic sugar in pectic polysaccharide is mainly galacturonic acid with a content of 28.69%, and a content of neutral sugar is higher, among which arabinose is the neutral sugar with the highest content. HG % and RG-I % in pectic polysaccharide were calculated, and the results show that the HG % mole percentage of the pectic polysaccharide is 22.25%, and the RG-I % mole percentage of the pectic polysaccharide is 70.25%, which indicating that the pectic polysaccharide is mainly composed of RG-I domain. A ratio of a sum of contents of arabinose and galactose to a content of the rhamnose is 9.0, indicating that the pectic polysaccharide has a higher degree of branching.

Figure 4:
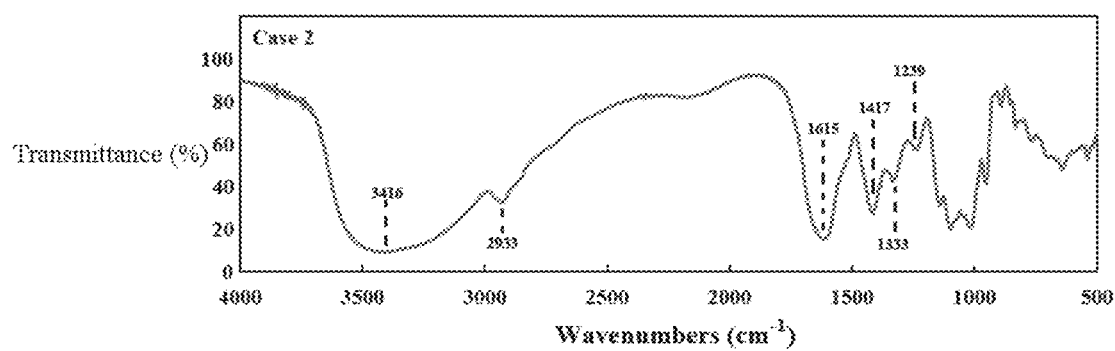
FIG. 4 is a near-red spectrum of embodiment 2.

FIG. 4 shows the near red spectrum of pectic polysaccharide. As shown in the FIG. 4, the absorption peak near 3416 cm$^{-1}$ is mainly caused by O—H stretching vibration, while the absorption peak at 2933 cm$^{-1}$ is caused by C—H stretching vibration of CH$_2$ group. The absorption peak at 1615 cm$^{-1}$ is attributed to the C=O stretching vibration of free carboxyl group. Generally, a ratio of a peak area at 1745 cm$^{-1}$ (COO—R) to a sum of peak areas at 1745 cm$^{-1}$ (OO—R) and 1615 cm$^{-1}$ (COO—) is defined as a degree of esterification. It can be seen from FIG. 2 that the degree of esterification of pectic polysaccharide is low.

Figure 5:
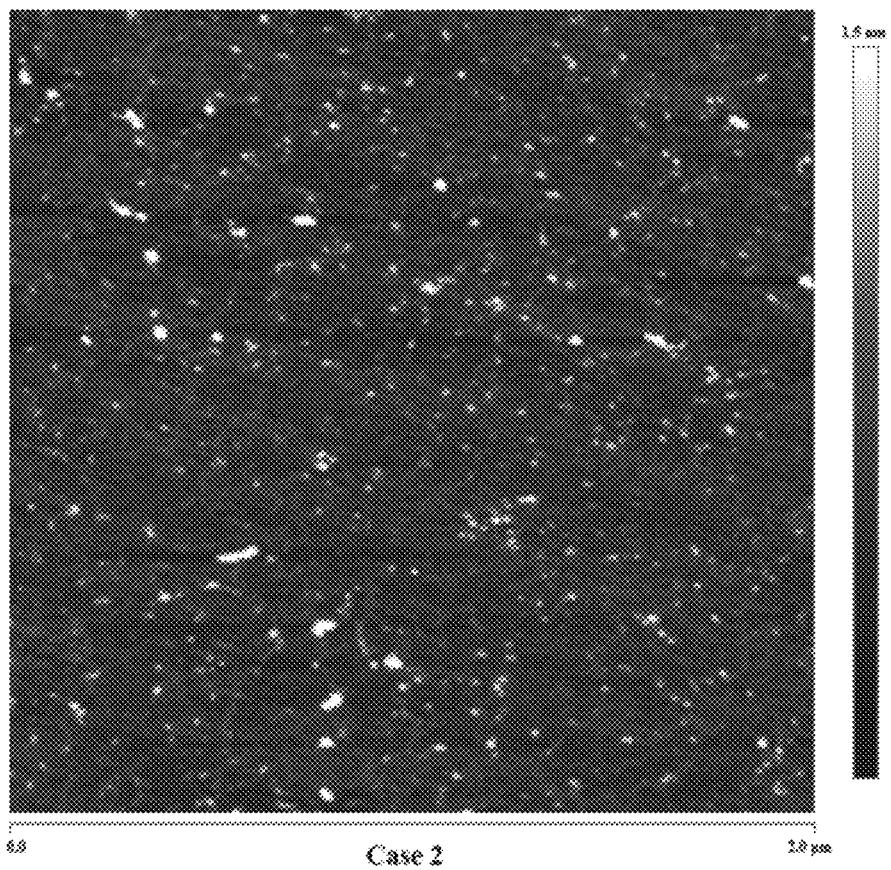
FIG. 5 is an atomic force microscope diagram of embodiment 2.

FIG. 5 shows an atomic force microscope image of the pectic polysaccharide. As shown in the FIG. 5, a chain morphology of the pectic polysaccharide is irregular spherical with a height of 1 to 4 nm. A chain height of the pectic polysaccharide is higher than that of single sugar (0.1 to 1 nm), which indicates there exists interactions among molecular chains and even a phenomenon of multiple molecular chains entangled.

Comparative Case 1

After drying and grinding citrus peel, citrus peel powers were sieved with 50 mesh sieve, 0.7 g citrus peel powders were fully mixed with 50 mmol/L sodium hydroxide solution containing 20 mmol/L sodium borohydride according to a solid-liquid ratio of 1:50 g/mL, then the obtained system was placed in a constant temperature water bath of 25° C. for performing a low-temperature alkaline extracting process, the extracting time was 90 min. The system subjected to the low-temperature alkaline extracting process was centrifuged at a speed of 6000 rpm for 20 min at room temperature, and 31 mL of supernatant was obtained after removing residues.

Further, the pectic polysaccharide precipitant obtained by ethanol precipitation was washed with absolute ethanol with a concentration of 80% v/v, and redissolved with deionized water, the redissolved pectic polysaccharide solution was transferred to a dialysis bag with a molecular weight cut-off of 3500 Da, dialyzed in pure water for 48 h, then dried in a vacuum freezer to obtain 0.106 g of dry pectic polysaccharide powder. The yield was 17.09% calculated according to the following formula:

The properties and structure of pectic polysaccharide were determined:

Molecular Weight

Pectic polysaccharide was dissolved in deionized water to obtain a solution with a concentration of 3 mg/mL, and the solution was injected into SEC-MALLS-RI (Wyatt Dawn Heleos-II, USA) system for detection after passing through a 0.22 μm water film. An injection volume was 50 μL, an analytical column was Shodex SB-804/806 (Showa Denko KK, Japan), a mobile phase was 0.15M sodium chloride solution, a flow rate was 0.5 mL/min, dn/dc=0.088 mL/g. A weight-average molecular weight of the pectic polysaccharide was measured to be 955 KDa, a number-average molecular weight of the pectic polysaccharide was measured to be 454 KDa, and the dispersibility of the pectic polysaccharide was measured to be 2.10.

Composition of Monosaccharide

Pectic polysaccharide was dissolved in deionized water to prepare a solution with a concentration of 2 mg/mL, 1 mL of 4M tetrafluoroacetic acid was added to the solution to acquire a mixture, the mixture was hydrolyzed at 110° C. for 8 hours, then cooled to the room temperature, and 1 mL of methanol was added into the mixture, then the mixture was dried by nitrogen. 10 mL of deionized water was added into the dried product to acquire a mixture, the mixture was injected into the ICS-5000 (Thermo Fisher, USA) system for detection after passing through the 0.22 μm water membrane. The injection volume was 25 μL, the analytical column was CarboPac PA10 Analytical (Thermo Fisher, USA), the mobile phase A was 18 mM sodium hydroxide solution, and the mobile phase B was 100 mM sodium acetate solution containing 15 mM sodium hydroxide, the flow rate was 1 mL/min. In a gradient mode, the time gradient was 0 min→15 min→35 min, and the corresponding concentration gradient was 0→100% mobile phase A→100% mobile phase B.

the pectic polysaccharide is mainly composed of RG-I domain. A ratio of a sum of contents of arabinose and galactose to a content of the rhamnose is 42.67, indicating that the pectic polysaccharide has a higher degree of branching.

Comparative Case 2

After drying and grinding citrus peel, the citrus peel powers was sieved with 50 mesh sieve, 0.7 g citrus peel powders were fully mixed with 50 mmol/L sodium hydroxide solution containing 20 mmol/L sodium borohydride according to a solid-liquid ratio of 1:50 g/mL, then the obtained system was placed in a constant temperature water bath of 25° C. for an ultrasonic treatment. The ultrasonic treatment conditions are: ultrasonic intensity 1.43 W/mL, ultrasonic temperature 25° C., ultrasonic volume 35 mL and ultrasonic time 40 minutes. The ultrasonic treated system was centrifuged at a speed of 6000 rpm for 20 min at room temperature, and 31 mL of supernatant was obtained after removing residues. Further, the pectic polysaccharide precipitant obtained by ethanol precipitation was washed with 50% v/v absolute ethanol for 1 times, then the pectic polysaccharide precipitant was redissolved with deionized water, the redissolved pectic polysaccharide solution was transferred to a dialysis bag with a molecular weight cut-off of 3500 Da, dialyzed in pure water for 48 h, then dried in a vacuum freezer to obtain 0.125 g of dry pectic polysaccharide powder. The yield was 20.16%.

The properties and structure of pectic polysaccharide were determined:

Molecular Weight

Pectic polysaccharide was dissolved in deionized water to obtain a solution with a concentration of 3 mg/mL, and the solution was injected into SEC-MALLS-RI (Wyatt Dawn Heleos-II, USA) system for detection after passing through a 0.22 μm water film. An injection volume was 50 μL, an analytical column was Shodex SB-804/806 (Showa Denko KK, Japan), a mobile phase was 0.15M sodium chloride solution, a flow rate was 0.5 mL/min, dn/dc=0.088 mL/g. A weight-average molecular weight of the pectic polysaccharide was measured to be 438 KDa, a number-average molecular weight of the pectic polysaccharide was measured to be 161 KDa, and the dispersibility of the pectic polysaccharide was measured to be 2.71.

TABLE 3

Composition of Monosaccharide of the pectic polysaccharide

| Type | Rhamnose (Rha) | Arabinose (Ara) | galactose (Gal) | Glucose (Glu) | mannose (Man) | Xylose (Xyl) | GalA (galacturonic acid) |
|---|---|---|---|---|---|---|---|
| Content (mol %) | 1.16 | 35.56 | 13.94 | 6.40 | 2.41 | 2.15 | 38.39 |

As shown in Table 1, the acidic sugar in pectic polysaccharide is mainly galacturonic acid with a content of 38.39%. A content of neutral sugar is relatively high, and among which arabinose is the neutral sugar with the highest content. HG % and RG-I % in pectic polysaccharide were calculated according to the following formula. The results show that the HG mole percentage of the pectic polysaccharide extracted by the low-temperature alkaline extracting method is 37.23%, and the RG-I mole percentage of the pectic polysaccharide extracted by the low-temperature alkaline extracting method is 51.82%, which indicating that Composition of Monosaccharide Pectic polysaccharide was dissolved in deionized water to prepare a solution with a concentration of 2 mg/mL, 1 mL of 4M tetrafluoroacetic acid was added to the solution to acquire a mixture, the mixture was hydrolyzed at 110° C. for 8 hours, then cooled to the room temperature, and 1 mL of methanol was added into the mixture, then the mixture was dried by nitrogen. 10 mL of deionized water was added into the dried product to acquire a mixture, the mixture was injected into the ICS-5000 (Thermo Fisher, USA) system for detection after passing through the 0.22 μm water membrane. The injection volume was 25 μL, the analytical column was CarboPac PA10 Analytical (Thermo Fisher, USA), the mobile phase A was 18 mM sodium hydroxide solution, and the mobile phase B was 100 mM sodium acetate solution containing 15 mM sodium hydroxide, the flow rate was 1 mL/min. In a gradient mode, the time gradient was 0 min→15 min→35 min, and the corresponding concentration gradient was 0→100% mobile phase A→100% mobile phase B.

TABLE 4

Monosaccharide composition of pectic polysaccharide

| Type | Rhamnose (Rha) | Arabinose (Ara) | galactose (Gal) | Glucose (Glu) | Xylose (Xyl) | GalA (galacturonic acid) |
|---|---|---|---|---|---|---|
| Content (mol %) | 2.78 | 43.22 | 12.29 | 3.01 | 2.54 | 36.16 |

As shown in Table 1, the acidic sugar in pectic polysaccharide is mainly galacturonic acid with a content of 36.16%. A content of neutral sugar in pectic polysaccharide is relatively high, and among which arabinose is the neutral sugar with the highest content. HG % and RG-I % in pectic polysaccharide were calculated according to the following formula. The results show that the HG % mole percentage of the pectic polysaccharide manufactured by the low-temperature alkaline extracting method under the assistance of ultrasound is 33.38%, and the RG-I % mole percentage of the pectic polysaccharide manufactured by the low-temperature alkaline extracting method under the assistance of ultrasound is 61.07%, which indicating that the pectic polysaccharide is mainly composed of RG-I domain. A ratio of a sum of contents of arabinose and galactose to a content of the rhamnose is 19.96, indicating that the pectic polysaccharide has a higher degree of branching.

From the above embodiments 1 and 2 and comparative cases 1 and 2, it can be seen that the ultrasound and pressure assisted method for extracting pectin significantly increases the extracting yield under the same extracting time; meanwhile, the mole percentage of RG-I domain of pectic polysaccharide is increased, and the functional domain is richer.

What is claimed is:

1. An ultrasound and pressure assisted method for extracting a pectin rich in rhamnogalacturonan I, comprising:
    (1) drying and crushing citrus peel to acquire citrus peel powders, sieving the citrus peel powders with a 50 mesh sieve, then dispersing the citrus peel powders in an alkaline solution containing sodium borohydride to obtain a mixed solution;
    transferring the mixed solution into a closed container, keeping a reaction temperature at 25 to 40° C., and introducing an inert gas into the closed container to control an internal static pressure at 0.2 to 0.4 mpa; carrying out an ultrasonic treatment on the mixed solution simultaneously, wherein an ultrasonic intensity is controlled at 0.5 to 3.5 W/ml, an ultrasound and pressure treatment time is controlled within 20 to 40 min;
    (2) centrifuging a solution subjected to step (1) at a speed of 6000 to 8000 rpm to remove residues, retaining a supernatant, adding absolute ethanol to the supernatant to precipitate pectic polysaccharide and isolating a pectic polysaccharide precipitant; and
    (3) adding water to the pectic polysaccharide precipitant subjected to step (2) to obtain a redissolved solution, transferring the solution to a dialysis bag with a molecular weight cut-off of 3000 to 3500 Da, dialyzing with running water for 48 hours, and drying in a vacuum freezer to obtain the pectin rich in rhamnogalacturonan I.

2. The ultrasound and pressure assisted method for extracting a pectin rich in rhamnogalacturonan I according to claim 1, wherein the citrus peel powders are mixed with the alkaline solution according to a solid-liquid ratio of 1:50 g/mL, and an alkali in the alkaline solution is sodium hydroxide or potassium hydroxide with a concentration of 0.05 to 0.1 mol/L, and a concentration of the sodium borohydride is 20 to 50 mmol/L.

3. The ultrasound and pressure assisted method for extracting a pectin rich in rhamnogalacturonan I according to claim 1, wherein the closed container is placed in a water bath environment.

4. The ultrasound and pressure assisted method for extracting a pectin rich in rhamnogalacturonan I according to claim 1, wherein the ultrasonic treatment is to insert an ultrasonic probe into the closed container and deep into the mixed solution.

5. The ultrasound and pressure assisted method for extracting a pectin rich in rhamnogalacturonan I according to claim 1, wherein a centrifuging time is 20 to 30 min, and an ethanol concentration for precipitation is 50% to 80% v/v.

6. The ultrasound and pressure assisted method for extracting a pectin rich in rhamnogalacturonan I according to claim 1, wherein the pectic polysaccharide precipitant obtained by precipitation with ethanol is washed with absolute ethanol for 2 to 3 times, and the water for redissolving and dialysis is deionized water.

* * * * *